United States Patent [19]

Mate et al.

[11] Patent Number: 5,247,034
[45] Date of Patent: Sep. 21, 1993

[54] PROCESS FOR PRODUCING TONER RESIN WITH AMINO ACID SOAPS

[75] Inventors: Robert D. Mate, Stow; Gary L. Burroway, Doylestown, both of Ohio

[73] Assignee: The Goodyear Tire & Rubber Company, Akron, Ohio

[21] Appl. No.: 956,220

[22] Filed: Oct. 5, 1992

[51] Int. Cl.$^5$ ................................................. C08F 2/24
[52] U.S. Cl. .................................. 526/215; 526/340; 526/329.1
[58] Field of Search ........................................ 526/215

[56] References Cited

U.S. PATENT DOCUMENTS

| | | | |
|---|---|---|---|
| 2,380,591 | 7/1945 | Fryling | 526/215 |
| 2,615,206 | 10/1952 | Lindstedt | 18/47.5 |
| 2,680,111 | 6/1954 | Brown | 526/215 |
| 4,298,672 | 11/1981 | Lu | 430/110 |
| 4,338,390 | 7/1982 | Lu | 430/110 |
| 4,469,770 | 9/1984 | Nelson | 430/110 |
| 4,558,108 | 12/1985 | Alexandru et al. | 526/340 |
| 4,868,259 | 9/1989 | Burroway et al. | 526/203 |

FOREIGN PATENT DOCUMENTS

| | | | |
|---|---|---|---|
| 53-233385 | 3/1978 | Japan | 526/215 |
| 53-81588 | 7/1978 | Japan | 526/215 |

*Primary Examiner*—Joseph L. Schofer
*Assistant Examiner*—N. Sarofim
*Attorney, Agent, or Firm*—Alvin T. Rockhill

[57] ABSTRACT

This invention is based upon the discovery that the characteristics of toner resins made by emulsion polymerization can be improved by utilizing amino acid soaps. Such amino acid soaps are typically salts of alkyl sarcosinates, such as ammonium lauryl sarcosinate and sodium lauryl sarcosinate. Toner resins which are made utilizing such amino acid surfactants do not exhibit significant electrical charge effects from the residual level of amino acid soap in the resin compared to resins made using other soap types, such as rosin acid soaps, fatty acid soaps, and the like. They also generally contain a lower level of ash since salts do not need to be used in their coagulation. As a result of the low level of ash, the toner resin made from the amino acid soap exhibits excellent resistance to moisture sensitivity and adsorption. This feature gives the toners made from these resins better electrical charge stability compared to resins made from other soaps since adsorbed moisture is known to neutralize electrical charges. This invention more specifically discloses a process for preparing a polymer which is particularly useful as a toner resin, which comprises (1) emulsion copolymerizing a vinyl aromatic monomer and a second monomer selected from the group consisting of conjugated diene monomers and an acrylate monomer selected from the group consisting of alkyl acrylate monomers and methacrylate monomers in the presence of an amino acid soap to produce the polymer; and (2) recovering the polymer from the aqueous emulsion.

20 Claims, No Drawings

PROCESS FOR PRODUCING TONER RESIN WITH AMINO ACID SOAPS

BACKGROUND OF THE INVENTION

The development of electrostatic latent images with toner particles is well known. The level of sophistication achieved for electrostatic latent image development systems over the years has been most remarkable. For example, slow and laborious manual systems commercialized in the late 1950's have evolved into elegant high speed development systems which spew out as many as three copies per second. Consequently, the performance standards for toners during the evolution of electrostatography have become increasingly stringent. In the early manual development systems, toner and carrier particles were merely moved over an imaging surface bearing an electrostatic latent image by hand, tilting a tray containing the imaging surface and toner and carrier particles. However, in recent years, toner particles are automatically recycled many thousands of times over imaging surfaces moving at extremely high velocities. Thus, durable toner materials are required to withstand the physical punishment of vigorous, prolonged and continuous use. Moreover, toner particles deposited in image configuration must now be fused in extremely short periods of time.

Due to the size limitations of electrostatic copying and printing machines, the fusing path must be relatively short. When one attempts to increase the heat energy applied to deposited toner images for fusing purposes within the constraints of a limited fusing path to achieve adequate fixing at higher rates, one approaches the charing or kindling temperature of the substrate bearing the toner image. Attempts to shorten the fusing path by utilizing flash fusing techniques often result in the formation of noxious fumes due to decomposition of components in some toners. Further, the cost and availability of energy to operate an electrostatographic imaging system is of increasing concern to users. In addition, toner materials must possess the proper triboelectric charging properties for electrostatic latent image development and must not agglomerate during storage and transportation. Thus, there is a great need for an improved toner having stable electrical and physical properties which can endure the harsh environment of high speed electrostatographic copiers and printers and which can also be fused at lower energy levels.

It is well known that electrostatic latent images can be developed with toner compositions which are comprised of a blend of toner resin particles and pigment particles. In such systems negatively charged toner particles are generally selected for the development of positively charged electrostatic latent images. However, in recent years, the use of positively charged toner compositions containing charge enhancing additives for the purpose of imparting positive charge to toner resin particles has become more popular. These positively charged toner compositions are particularly useful for causing the development of negatively charged electrostatic latent images formed on layered organic photoreceptor imaging members. Examples of positively charged toner compositions useful for causing the development of negatively charged electrostatic latent images are disclosed in U.S. Pat. No. 4,298,672, U.S. Pat. No. 4,338,390, and U.S. Pat. No. 4,469,770.

Certain copolymers of styrene and butadiene have been developed which meet the demanding requirements of positively charged toner compositions. Such styrene-butadiene copolymers can be made by various techniques with emulsion polymerization being the most common. However, there are a number of traditional drawbacks associated with utilizing emulsion polymerization in preparing such toner resins which are utilized in preparing toners designed to build stable charge. For instance, undesirable residual contaminants are typically present in toner resins made by emulsion polymerization. In many cases, these residual contaminants have a very detrimental effect on the performance characteristics of the toner resin.

Rosin acids and fatty acids are commonly utilized as emulsifiers in preparing toner resins by emulsion polymerization. The presence of residual rosin acids and residual fatty acids in toner resins limits their ability to build stable electrical charges. The coagulants utilized in recovering the resin from the aqueous emulsion are also generally present as residual contaminants in such toner resins. The presence of ash from the coagulants also limits the ability of toners made utilizing such resins to build a stable charge. For these reasons, emulsion polymerization has typically been considered to be inferior to solution polymerization and suspension polymerization techniques for synthesizing such toner resins.

SUMMARY OF THE INVENTION

By utilizing the process of this invention, toner resins can be prepared which are of a very high quality. These toner resins can be utilized in making toners which are capable of building very stable charges. Heretofore it was only possible to make toner resins having such physical characteristics by solution polymerization or suspension polymerization routes.

The key to this invention is the utilization of an amino acid soap in preparing the emulsion. This circumvents the problems associated with utilizing rosin acid soaps or fatty acid soaps. By virtue of the fact that such emulsions can be coagulated without the utilization of salts, the resins made by this process exhibits low levels of residual ash. This is also advantageous in that the presence of ash reduces the level of charge which can be realized. As a result of the low level of ash, the toner resin made from the amino acid soap exhibits excellent resistance to moisture sensitivity and adsorption. This feature gives the toners made from these resins better electrical charge stability compared to resins made from other soaps since adsorbed moisture is known to neutralize electrical charges.

This invention more specifically describes a process for preparing a polymer which is particularly useful as a toner resin, which comprises (1) emulsion copolymerizing a vinyl aromatic monomer and a second monomer selected from the group consisting of conjugated diene monomers and an acrylate monomer selected from the group consisting of alkyl acrylate monomers and alkyl methacrylate monomers in the presence of an amino acid soap to produce the polymer; and (2) recovering the polymer from the aqueous emulsion.

DETAILED DESCRIPTION OF THE INVENTION

The toner resins made by utilizing the process of this invention are comprised of repeat units which are derived from a vinyl aromatic monomer and a second monomer selected from the group consisting of conjugated diene monomers and alkyl acrylate monomers. These polymers are, accordingly, made by copolymerizing the vinyl aromatic monomer with a conjugated diene monomer or an alkyl acrylate monomer. The conjugated diene monomers which can be used typically contain from 4 to about 10 carbon atoms. As a general rule, the conjugated diene monomer will contain from 4 to about 6 carbon atoms. Isoprene and 1,3-butadiene are highly preferred conjugated diene monomers for utilization in making toner resins by the process of this invention.

Generally, any vinyl aromatic monomer which is known to polymerize in free radical systems can be used. Such vinyl aromatic monomers typically contain from 8 to 20 carbon atoms. Usually, the vinyl aromatic monomer will contain from 8 to 14 carbon atoms. Some representative examples of vinyl aromatic monomers that can be utilized include styrene, 1-vinyl napthalene, 2-vinyl napthalene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene, divinylbenzene, and the like. Styrene is generally the most preferred vinyl aromatic monomer.

The alkyl acrylate monomers that can be used generally have the structural formula:

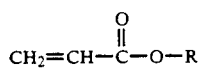

wherein R represents an alkyl group containing from 1 to 10 carbon atoms. The alkyl group in such alkyl acrylate monomers will preferably contain from 2 to 8 carbon atoms with alkyl groups which contain 4 carbon atoms being most preferred. Accordingly, ethyl acrylate, propyl acrylate, butyl acrylate, pentyl acrylate, hexyl acrylate, and 2-ethyl hexyl acrylate are preferred alkyl acrylate monomers with butyl acrylate being the most preferred. The alkyl groups in such alkyl acrylate monomers can be straight chained or branched. Thus, normal-propyl acrylate, isopropyl acrylate, normal butyl acrylate, or tertiary-butyl acrylate can be employed. Normal-butyl acrylate is a particularly preferred monomer. The alkyl methacrylate monomers that can be used normally have alkyl groups which contain from 1 to about 20 carbon atoms. The alkyl methacrylate monomer will preferably have an alkyl group which contains from 2 to 12 carbon atoms. Some representative examples of alkyl methacrylate monomers which can be used include: methyl methacrylate, butyl methacrylate, 2-ethylhexyl methacrylate, lauryl methacrylate, and the like.

One particularly preferred polymer which can be made by the process of this invention is comprised of about 80 weight percent to about 95 weight percent vinyl aromatic monomers and from about 5 weight percent to about 20 weight percent conjugated diene monomers. It is particularly preferred for this polymer to contain from about 85 weight percent to about 92 weight percent vinyl aromatic monomers and from about 8 weight percent to about 15 weight percent conjugated diene monomers. It is also preferred for the vinyl aromatic monomer to be styrene and for the conjugated diene monomer to be 1,3-butadiene in these polymers.

Another highly preferred polymer which can be made by the process of this invention is comprised of about 70 weight percent to about 95 weight percent vinyl aromatic monomers and from about 5 weight percent to about 30 weight percent alkyl acrylate monomers. It is more preferred for such polymers to contain from about 85 weight percent to about 90 weight percent vinyl aromatic monomers and from about 10 weight percent to about 15 weight percent alkyl acrylate monomers. It is also preferable for the vinyl aromatic monomer to be styrene and for the alkyl acrylate monomer in these polymers to be butyl acrylate.

Such polymers will typically have glass transition temperatures which are within the range of about 40° C. to about 70° C. It is normally preferred for the polymer to have a glass transition temperature which is within the range of about 45° C. to about 65° C. As a general rule, higher levels of vinyl aromatic monomers result in higher glass transition temperatures. On the other hand, lower levels of vinyl aromatic monomers result in the polymer having lower glass transition temperatures. As a general rule, the glass transition temperature of the polymer should not be below about 40° C. because lower glass transition temperatures are indicative of polymers which are too soft for utilization in toner resin applications. The frangibility of toners is compromised if the glass transition temperature of the toner resin is above about 70° C.

Free radical emulsion polymerization techniques are utilized in conducting the process of this invention. Essentially any type of free radical generator can be used to initiate such free radical emulsion polymerizations. For example, free radical generating chemical compounds, ultra-violet light or radiation can be used. In order to ensure a satisfactory polymerization rate, uniformity, and a controllable polymerization, free radical generating chemical agents are generally used. Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. Persulfate initiators, such as potassium persulfate and ammonium persulfate are especially useful in such aqueous emulsion polymerizations. Hydrogen peroxide is also a highly preferred free radical initiator which can be used in the process of this invention.

Generally from about 0.1 phm (parts per hundred parts of monomer) to about 1.0 phm of initiator will be utilized to initiate the copolymerization. In most cases about 0.2 to about 0.7 phm of a free radical initiator will be utilized. Preferably, about 0.3 phm to about 0.5 phm of a free radical initiator will be employed.

To reduce the molecular weight of the polymer, the emulsion polymerization can be conducted in the presence of one or more chain transfer agents. The chain transfer agent will typically be employed at a level which is within the range of 0.005 phm to about 6 phm. Alkyl mercaptans are particularly preferred for utilization as the chain transfer agent. Tertiary-dodecylmercaptan and normal-dodecylmercaptan are highly preferred with normal-dodecylmercaptan being the most highly preferred. Mercaptans having lower molecular weight alkyl groups cause dramatic reductions in molecular weight. However, the use of such low molecular weight mercaptans results in odor problems. For instance, toners made with resins prepared utilizing such low molecular weight mercaptans can give off very unpleasant odors when the toner resin is ultimately used in a copier. Higher molecular weight mercaptans typically do not cause odor problems. However, they are not very effective at reducing the molecular weight of the polymer being prepared by free radical emulsion polymerization. It is typically advantageous for the chain transfer agent to be added incrementally throughout the polymerization.

The copolymerizations of this invention are carried out in the presence of an amino acid soap. These amino acid soaps are typically salts of alkyl sarcosines. The alkyl sarcosine will typically have an alkyl group which contains from about 10 to about 20 carbon atoms. Salts can be readily formed by reacting the alkyl sarcosines with an appropriate base, such as sodium, potassium, ammonium hydroxide, monoethanol amine, diethanol amine, or triethanol amine. As a general rule, it is preferred to utilize sodium alkyl sarcosinates. Some representative examples of sodium alkyl sarcosinates which can be used include sodium lauryl sarcosinates, sodium cocoyl sarcosinates, sodium myristoyl sarcosinates, sodium oleoyl sarcosinates, sodium stearoyl sarcosinates, and the like. Sodium lauryl sarcosinate is a particularly preferred amino acid soap for utilization in the process of this invention. Sodium lauryl sarcosinate is commercially available from W. R. Grace and Company as Hamposyl ® L-30 sodium lauryl sarcosinate.

Generally from about 0.5 phm to about 6 phm of the amino acid soap is utilized in preparing the aqueous polymerization medium. The use of less than about 0.5 phm of the amino acid soap leads to latex instability. On the other hand the utilization of more than about 6 phm of the amino acid soap causes isolation problems. In most cases, it will be preferred to utilize from 1 phm to 2 phm of the amino acid soap. The precise amount of amino acid soap required in order to attain optimal results will, of course, vary with the monomers being polymerized. However, persons skilled in the art will be able to easily ascertain the specific amount of emulsifier required in order to attain optimal results. As a general rule, it is beneficial to add the amino acid soap incrementally as the polymerization proceeds.

The free radical emulsion polymerization will typically be conducted at a temperature which is within the range of about 100° F. (39° C.) to about 200° F. (93° C.). It is generally preferred for the polymerization to be carried out at a temperature which is within the range of 115° F. (46° C.) to about 175° F. (74° C.). To increase conversion levels, it is typically advantageous to increase the temperature as the polymerization proceeds. For instance, the polymerization temperature could be maintained at about 125° F. (52° C.) at the beginning of the polymerization and increased to a final temperature of about 175° F. (74° C.) at the end of the polymerization.

The polymerization time required in order to carry out such free radical emulsion polymerization generally ranges between about 3 hours and about 12 hours. In most cases, the polymerization reaction can be completed in about 4 to about 8 hours.

After the polymerization has been completed, the toner resin can be recovered from the emulsion by coagulation. Divalent salts, such as calcium salts, magnesium salts, barium salts, zinc salts, and the like can be used in the coagulation. Trivalent salts, such as aluminum salts, are generally better. The latex can be coagulated with alum (aluminum potassium sulfate) or an acid such as sulfuric acid, hydrochloric acid, nitric acid or acetic acid. It is highly preferred to coagulate the latex with sulfuric acid. It is not necessary to utilize salts or amines in such coagulation procedures. In fact, it is highly preferred to carry out the coagulation in the absence of salts or amines. This is because residual amounts of such compounds are detrimental to the ultimate properties of the toner resin. Hydrochloric acid can be used but is generally not preferred because it is too corrosive and can give off HCl gas. Nitric acid is also too corrosive and can give off nitrous oxide. The utilization of acetic acid can result in odor problems. For these reasons, sulfuric acid is highly preferred for utilization in carrying out the coagulation.

The cake of resin recovered by coagulation is then typically filtered and washed with water. It is then capable of being dewatered by the process described in U.S. Pat. No. 2,615,206, known as syneresis. The teachings of U.S. Pat. No. 2,615,206 are incorporated herein by reference in their entirety. It is highly advantageous that the resins made by the process of this invention are capable of undergoing such a dewatering process. In this syneresis process, the cake of resin is simply heated to an elevated temperature which shrinks (contracts) the cake of resin thereby squeezing the water out of it. This syneresis process typically reduces the water content of the resin from about 70 percent to about 30 percent. The resin can then be further dried on an apron dryer.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE

In this experiment, a toner resin was synthesized utilizing the emulsion copolymerization technique of this invention. In the procedure utilized, 450 grams of water, 10 grams of a 30 percent aqueous solution of sodium lauryl sarcosinate, 0.75 grams of ammonium persulfate, 259.5 grams of styrene, 3 grams of dodecyl mercaptan (a chain transfer agent), and 40.5 grams of 1,3-butadiene were charged into a 1 quart (0.95 liter) polymerization bottle. The polymerization bottle was maintained at a temperature of 125° F. (52° C.) with the solids content of the latex produced being monitored. After a solids content of about 40 percent was attained, the polymerization bottle was cooled to room temperature. The latex was coagulated and the resin recovered was compared to a toner resin having the same monomeric content and ratio which was prepared by conventional emulsion polymerization. This comparison is shown in Table I. Table I also shows a typical toner resin specification.

TABLE I

|   | Typical Toner Spec. | Toner Resin Made with Amino Acid Soap | Typical Emulsion Polymer Toner Resin |
|---|---|---|---|
| Melt Index | 27.5 ± 0.4 | 27.6 | 27.5 |
| pH | 5.8–7.5 | 7.0 | 4.0–5.0 |
| % Water | <0.5 | 0.1% | <0.5% |
| % Styrene | 86.5 ± 0.4 | 84.8 | 86.5 ± 0.4 |
| Residual Butadiene | <0.6 ppm | 0.0 | 0.0 |
| Residual Styrene | <1500 ppm | 171 ppm | <100 ppm |
| Residual Vinylcyclohexane | <250 ppm | 0.0 ppm | <100 ppm |
| Residual Benzene | <140 ppm | 0.0 ppm | <100 ppm |
| Residual Phenylcyclohexane | <1000 ppm | 85 ppm | <100 ppm |
| Residual Benzoic Acid | <0.12% | 0.009% | <0.1% |
| SO4 Ion | <500 | 33 ppm | 600–800 ppm |
| NO3 Ion | <200 ppm | 0.0 | <20 ppm |
| Ash | <0.15% | 0.002% | 0.3–0.5% |

As can be seen, utilizing the amino acid soap greatly reduced the amount of residual ash, sulfate ion, and nitrate ion present in the toner resin. In fact, the amount of residual ash in the toner resin made by the process of this invention was more than 100 times less than that detected in toners made by conventional emulsion polymerization.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a polymer which is particularly useful as a toner resin, which comprises (1) emulsion copolymerizing a vinyl aromatic monomer and a second monomer selected from the group consisting of conjugated diene monomers and an acrylate monomer selected from the group consisting of alkyl acrylate monomers and alkyl methacrylate monomers in the presence of an amino acid soap to produce the polymer wherein the amino acid soap is the salt of an alkyl sarcosine having an alkyl group which contains from about 10 to about 20 carbon atoms; and (2) recovering the polymer from the aqueous emulsion.

2. A process as specified in claim 1 wherein from about 0.5 phm to about 6 phm of the amino acid soap is present.

3. A process as specified in claim 1 wherein the amino acid soap is an ammonium alkyl sarcosinate.

4. A process as specified in claim 3 wherein the vinyl aromatic monomer is styrene.

5. A process as specified in claim 4 wherein the second monomer is 1,3-butadiene.

6. A process as specified in claim 4 wherein the second monomer is selected from the group consisting of N-butyl acrylate and 2-ethylhexyl acrylate.

7. A process as specified in claim 5 wherein the monomers copolymerized include from about 80 weight percent to about 95 weight percent styrene and from about 5 weight percent to about 20 weight percent 1,3-butadiene, based upon total monomers.

8. A process as specified in claim 5 wherein the monomers copolymerized include from about 85 weight percent to about 95 weight percent styrene and from about 8 weight percent to about 15 weight percent 1,3-butadiene, based upon total monomers.

9. A process as specified in claim 6 wherein the monomers copolymerized include from about 70 weight percent to about 95 weight percent styrene and from about 5 weight percent to about 30 weight percent of a member selected from the group consisting of N-butyl acrylate and 2-ethylhexyl acrylate.

10. A process as specified in claim 6 wherein the monomers copolymerized include from about 85 weight percent to about 90 weight percent styrene and from about 10 weight percent to about 15 weight percent N-butyl acrylate, based upon total monomers.

11. A process as specified in claim 2 wherein the amino acid soap is ammonium lauryl sarcosinate.

12. A process as specified in claim 11 wherein from about 1 phm to about 2 phm of the ammonium lauryl sarcosinate is present.

13. A process as specified in claim 3 wherein said copolymerization is initiated with a free radical initiator.

14. A process as specified in claim 13 wherein said free radical initiator is a persulfate initiator.

15. A process as specified in claim 13 wherein the free radical initiator is hydrogen peroxide.

16. A process as specified in claim 3 wherein said copolymerization is conducted at a temperature which is within the range of about 100° F. to about 200° F.

17. A process as specified in claim 4 wherein said copolymerization is conducted at a temperature which is within the range of about 115° F. to about 175° F.

18. A process as specified in claim 3 wherein the polymer is recovered from the aqueous emulsion by coagulation with sulfuric acid.

19. A process as specified in claim 18 wherein said coagulation is carried out without utilizing salts or amines as coagulating agents.

20. A process as specified in claim 18 wherein water is removed from the polymer recovered by syneresis.

* * * * *